United States Patent [19]

Monk

[11] 4,369,164

[45] Jan. 18, 1983

[54] RECOVERY OF COPPER FROM ARSENICAL DROSSES BY AMMONIUM ARSENATE LEACH

[75] Inventor: Hayden Monk, Downend, England

[73] Assignees: Metallurgical Process Limited; I.S.C. Smelting Limited, both of Nassau, The Bahamas

[21] Appl. No.: 327,744

[22] Filed: Dec. 4, 1981

[30] Foreign Application Priority Data

Dec. 8, 1980 [GB] United Kingdom ............... 8039261

[51] Int. Cl.$^3$ .................... C01G 3/14; C22B 3/00; C22B 30/04; C01G 28/00
[52] U.S. Cl. ................... 423/24; 423/33; 423/35; 423/37; 423/87; 423/602
[58] Field of Search ............ 423/47, 32, 87, 601, 423/602, 33; 75/103; 204/DIG. 13

[56] References Cited

U.S. PATENT DOCUMENTS 3,971,652  7/1976  Bryson ............................. 423/24

FOREIGN PATENT DOCUMENTS 1399281  2/1972  United Kingdom ............... 423/33
1490813  7/1975  United Kingdom ............... 423/33

*Primary Examiner*—Brian E. Hearn
*Assistant Examiner*—Robert L. Stoll
*Attorney, Agent, or Firm*—Holman & Stern

[57] ABSTRACT

A process for leaching copper and arsenic from copper dross containing copper arsenide and separated from molten lead bullion comprises leaching the dross with an aqueous ammoniacal solution containing arsenate as the predominant anion under oxidizing conditions to obtain a leachate, removing copper from the leachate to obtain a raffinate and re-cycling raffinate to the leaching stage, and removing a bleed of raffinate from the circuit and precipitating a substantially insoluble arsenic compound from the raffinate bleed to remove arsenic from the circuit.

11 Claims, 1 Drawing Figure

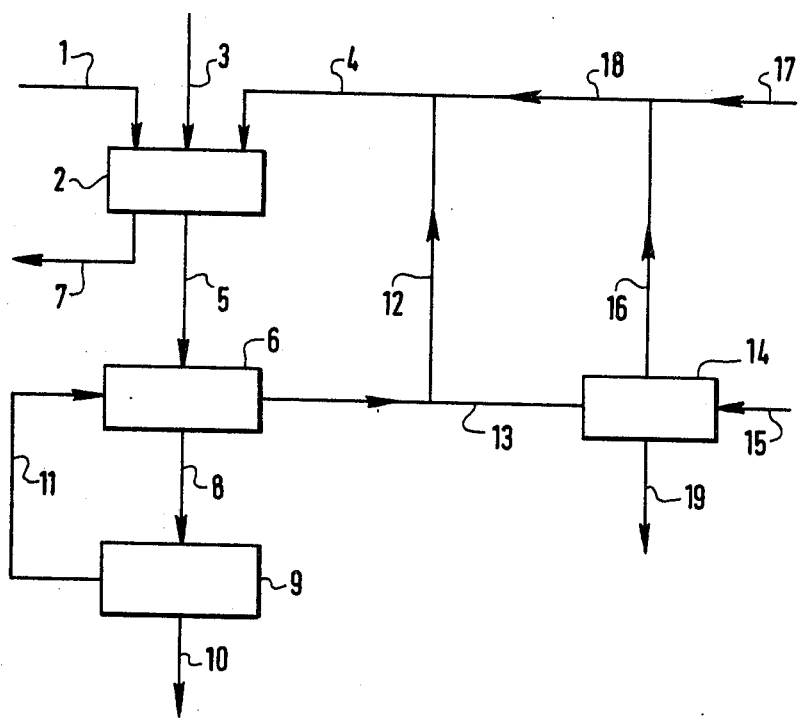

RECOVERY OF COPPER FROM ARSENICAL DROSSES BY AMMONIUM ARSENATE LEACH

This invention relates to the recovery of copper from arsenical drosses, and more particularly to the leaching and recovery of copper and arsenic from drosses containing substantial amounts of arsenic, derived from the blast-furnace smelting of lead or zinc bearing oxidic materials.

High levels of arsenic in the feeds to certain lead/zinc blast-furnaces lead to high arsenic contents in the copper drosses recovered from the lead bullion. For example, samples of drosses obtained from two North American smelters contained 7.6 and 10.9% (dry weight) of arsenic. The processing of these arsenical drosses by pyrometallurgical methods usually leads to environmental and hygiene problems and to processing difficulties which arise due to speiss formation. Hence, there is a need for a hydrometallurgical technique whereby arsenic can be removed within the plant in a safely-disposable form (e.g. ferric arsenate) for dumping or sale.

It is known to use aqueous ammoniacal sulphate/carbonate mixtures for leaching copper from drosses separated from lead bullion produced in a zinc/lead blast furnace (see for example British Patent Specification No. 1 399 281). Also where a substantial proportion of sulphur is present in such a dross it is known to use a leach solution consisting predominantly of ammonium sulphate and ammonium hydroxide in the substantial absence of carbonate ions (see British Patent Specification No. 1 490 813).

However, the problem of leaching copper from high arsenic-content dross has only recently been investigated and one of the main difficulties associated with such a problem is to produce not only a copper-bearing solution amenable to subsequent copper recovery (as cathode copper or a copper salt) but also to produce an arsenical product which is in an inert and safely-disposable form or suitable for processing to a saleable product. Preferably the arsenical product should be commercially saleable, e.g. as a pigment, ceramic enamel, paint, mordant or timber preservative, but this is only possible in a few locations in the world.

The present invention provides a process for leaching copper and arsenic from copper dross containing copper arsenide and separated from molten lead bullion, comprising leaching the dross, in finely-divided form, with an aqueous ammoniacal solution containing arsenate as the predominant anion, under oxidizing conditions, to obtain a leachate, removing copper from the leachate to obtain a raffinate and re-cycling raffinate to the leaching stage, and wherein a bleed of raffinate is removed from the circuit and a substantially insoluble arsenic compound is precipitated, directly or indirectly, from the raffinate bleed, to remove arsenic from the circuit.

Preferably the aqueous ammoniacal leach solution also contains sulphate ions and/or carbonate ions.

The leach solution should preferably contain at least 50 mole percent of arsenate ions, based on all anions present in the leach solution. More preferably the mole ratio of arsenate to all other anions present in the leach solution is at least 2:1.

Preferably copper is extracted from the leachate by means of a copper-selective organic solvent, e.g. an aromatic hydroxy-oxime such as those sold by Henkel Corporation under the Trade Mark "LIX", to produce a raffinate for re-cycling to the leach reactor.

Alternatively, copper may be precipitated as oxide by boiling off ammonia, e.g. by steam injection.

Preferably the leach solution contains about 40 g/l ($\pm 10\%$) of ammonia (as ammonium hydroxide) in addition to any ammonia combined with sulphate and other anions other than arsenate. This ensures the maximum solubility of the arsenate ion when copper has been removed from the leachate with the organic solvent mentioned above. Higher or lower concentrations of this "free" ammonia may tend to encourage deposition of ammonium arsenate crystals in the raffinate, depending upon arsenate concentration.

Preferably the proportion of raffinate bled from the circuit is minimized to reduce the heating costs associated with the recovery of its ammonia content. This proportion depends on the quantity of arsenic leached in each cycle and/or the concentration of arsenic in the leach solution, i.e. the quantity of new arsenic leached must be equal to that withdrawn from the system. For example, in the case where 4.4–5.9 g/l is leached, a 7.8–11.3% volume bleed of raffinate of the following typical concentration is required $AsO_4$ 36.6–53.8 g/l (as As)
$SO_4$ 15.5–33.1 g/l (as $SO_4$)
$NH_3$ 46–61 g/l (Total $NH_3$).

The practical maximum arsenic concentration depends partly on the sulphate concentration. As the sulphate is derived from the oxidation of sulphur in the dross, its concentration in leachate and therefore its effect on arsenate solubility will vary from dross to dross. However, it has been found possible to use solutions containing up to 61 g/l arsenic (present as arsenate) and 66 g/l $SO_4$ at room temperature.

Preferably the aqueous raffinate bleed solution is subjected to heating, more preferably boiling, in the presence of a base, e.g. lime, magnesium oxide or caustic soda (sodium hydroxide), in order to drive off ammonia and produce insoluble calcium arsenate, magnesium arsenate or a sodium arsenate solution. Where sodium arsenate is produced this may be reacted with a ferric salt, e.g. ferric sulphate, at a pH value of 3–6 to yield an insoluble ferric arsenate which can be disposed of, e.g. by dumping. Alternatively, arsenic may be precipitated from the raffinate bleed as insoluble arsenic sulphide, e.g. by means of hydrogen sulphide.

The leaching stage should preferably be carried out with agitation and in the presence of an oxidizing gas, e.g. air or oxygen.

The temperature of leaching may be suitably from 20° to 100° C., but a temperature of from 40° to 60° C. is preferred. The process is normally carried out at atmospheric pressure but may be carried out in a pressurized vessel.

The copper-bearing organic solvent may be stripped with sulphuric acid and then the aqueous acid solution subjected to electrolysis or purified and subjected to crystallization to produce cathode copper or copper sulphate.

BRIEF DESCRIPTION OF THE DRAWING

The invention will be further described, by way of example only, with reference to the accompanying drawing, which is a schematic flow sheet illustrating the process according to the present invention.

In the process illustrated in the drawing, arsenical-bearing copper dross separated from pyrometallurgical lead bullion is fed through a line 1 into a leach reactor 2 to which is also fed air through a line 3. In the reactor 2 the dross is leached, in finely-divided form, with an aqueous ammoniacal solution containing arsenate as the predominant anion fed into the reactor through a line 4, to give a leachate. The leachate is removed from the reactor 2 through a line 5 and fed to a mixer/settler system 6 where it is subjected to extraction with a copper-selective organic solvent, which has been washed and stripped with sulphuric acid, to produce aqueous copper sulphate.

Residual solids are removed from the reactor 2, by filtration, and discharged through a line 7. A filter (not shown) is provided in the line 7 and the washings from this filter fed to join the line 5.

The aqueous copper sulphate formed in the mixer/settler 6 is removed therefrom through a line 8 and passed to a further vessel 9 known as a tankhouse. Copper is recovered from the copper sulphate in the tankhouse 9 and discharged therefrom through a line 10, while strip acid (sulphuric acid) is recycled from the tankhouse 9 to the mixer/settler 6 through a line 11.

Removal of copper from the leachate solution in the mixer/settler 6 produces a raffinate which is recycled from the mixer/settler 6 to the reactor 2 through a line 12.

In this specification the term "raffinate" is to be understood as thus described, i.e. as the liquor obtained upon removal of copper from the leachate solution obtained by leaching arsenical-bearing copper dross with an aqueous ammoniacal solution containing arsenate as the predominant anion.

In addition a bleed of the raffinate discharged through the line 12 is passed through a line 13 to a still 14 into which caustic soda is introduced through a line 15. In the still 14 the raffinate bleed solution is heated with the caustic soda to boil off ammonia which is removed through a line 16. This ammonia is absorbed in water supplied through a line 17 and recycled, through a line 18, to join the raffinate recycled through the line 12 to constitute the leaching solution fed into the reactor 2 through the line 4.

Sodium arsenate is removed from the still 14 through a line 19 and is treated with ferric sulphate to precipitate insoluble ferric arsenate.

The following experimental results illustrate the leaching of arsenical copper dross with an ammonium arsenate solution, which constitutes the first stage of the process according to the invention as described above.

Arsenical copper dross having the following analysis (% by weight):

| Pb | Cu | As | Zn | Fe | S | Ag |
|---|---|---|---|---|---|---|
| 42.1 | 31.7 | 10.9 | 1.5 | 2.5 | 3.8 | 0.47 | was leached with 1 liter of ammonium arsenate solution, initially containing no copper, under oxygen at atmospheric pressure and at 50°–60° C. for 6 hours, using an agitation rate of 1590 r.p.m.

The dross was first ground in a hammer-mill to give the following particle size analysis.

| Size (Microns) | Fractional % | Cumulative % |
|---|---|---|
| +425 | 0.006 | 100 |
| +295–425 | 1.038 | 99.994 |
| +212–295 | 3.287 | 98.956 |
| +125–212 | 12.187 | 95.669 |
| +75–125 | 17.446 | 83.482 |
| −75 | 66.036 | 66.036 |

Three leaching runs were carried out on this ground dross, giving the results as shown in the following Table I. The line reference numerals given in the table in brackets correspond to those of the accompanying drawing.

TABLE I

| Run No. | 1 | | 2 | | 3 | |
|---|---|---|---|---|---|---|
| Dross Used (a) Weight (line 1) | 63.2 | | 63.2 | | 82.7 | |
| (b) Copper content (g) | 20.0 | | 20.0 | | 26.2 | |
| Ph of initial leach solution | 10.1 | | 9.82 | | 10.0 | |
| Copper Analyses | (g) | (%) | (g) | (%) | (g) | (%) |
| Filtrate (line 5) | 18.99 | 94.55 | 18.85 | 94.34 | 24.50 | 93.48 |
| Samples | 0.64 | 3.20 | 0.36 | 1.80 | 0.48 | 1.83 |
| Washings | 0.20 | 1.00 | 0.30 | 1.50 | 0.49 | 1.87 |
| Filter Cake (line 7) | 0.25 | 1.25 | 0.47 | 2.35 | 0.74 | 2.82 |
| | 20.08 | 100.00 | 19.98 | 99.99 | 26.21 | 100.00 |
| Filtrate Volume (mls) (line 5) | 979 | | 945 | | 970 | |
| pH | 9.77 | | 9.52 | | 9.20 | |
| Filter Cake Dry Weight (g) (line 7) | 36.1 | | 38.3 | | 49.8 | |
| % Copper | 0.76 | | 1.22 | | 1.48 | |
| Analyses of Solutions (g/l) | | | | | | |
| NH₃ Initial | 45.8 | | 61.0 | | 52.8 | |
| Filtrate | 45.5 | | 57.9 | | 52.7 | |
| SO₄ Initial | 22.3 | | 46.8 | | 36.0 | |
| Filtrate | 26.6 | | 50.8 | | 39.4 | |
| As Initial | 31.8 | | 44.0 | | 47.2 | |
| Filtrate | 36.6 | | 50.5 | | 53.8 | |
| Analyses of Washings (g) | | | | | | |
| SO₄ | 0.35 | | 0.30 | | 0.65 | |
| As | 0.41 | | 0.76 | | 0.95 | |
| Arsenic in Dross Recovered in filtrate and Washings (%) | 64.5 | | 65.1 | | 65.9 | |

As will be seen from the Table, the leaching process in accordance with the invention using arsenate leach liquor results in up to almost 99% copper solubilization (copper analysis of filtrate+samples+washings) coupled with 64–65% arsenic solubilization. A proportion of this arsenic is then bled out of the circuit after copper extraction in accordance with the invention as above described to leave an optimum amount of arsenate in solution for the purpose of leaching fresh dross.

I claim:

1. A process for leaching copper and arsenic from copper dross containing copper arsenide and separated from molten lead bullion, comprising: leaching the dross, in finely-divided form, with an aqueous ammoniacal solution containing arsenate as the predominant anion, under oxidizing conditions, to obtain a leachate; removing copper from the leachate to obtain a raffinate and re-cycling raffinate to the leaching stage; and removing a bleed of raffinate from the circuit and precipitating a substantially insoluble arsenic compound from the raffinate bleed, to remove arsenic from the circuit.

2. The process according to claim 1, wherein the leach solution contains at least one of sulphate ions and carbonate ions in addition to arsenate.

3. The process according to claim 1, wherein the leach solution contains at least 50 mole percent of arsenate ions, based on all anions present.

4. The process according to claim 3, wherein the mole ratio of arsenate to all other anions present in the leach solution is at least 2:1.

5. The process according to claim 1, wherein the leach solution contains about 40 g/l of ammonia as ammonium hydroxide in addition to that combined with sulphate and other anions other than arsenate.

6. The process according to claim 1, wherein copper is removed from the leachate by means of a copper-selective organic solvent.

7. The process according to claim 1, wherein the raffinate bleed is heated, in the presence of a base, to drive off ammonia and form an arsenate compound.

8. The process according to claim 7, wherein the base is sodium hydroxide and wherein sodium arsenate is formed.

9. The process according to claim 8, wherein the sodium arsenate formed is reacted with a ferric salt to yield insoluble ferric arsenate.

10. The process according to claim 1, wherein insoluble arsenic sulphide is precipitated from the raffinate bleed by means of hydrogen sulphide.

11. The process according to claim 1, wherein leaching is carried out at 40° to 60° C. in the presence of an oxidizing gas.

* * * * *